(No Model.) 3 Sheets—Sheet 1.

J. B. HURD & H. H. McLANE.
SINGLE SEED PLANTER.

No. 445,641. Patented Feb. 3, 1891.

WITNESSES:

INVENTORS (No Model.) 3 Sheets—Sheet 2.
J. B. HURD & H. H. McLANE.
SINGLE SEED PLANTER.
No. 445,641. Patented Feb. 3, 1891.
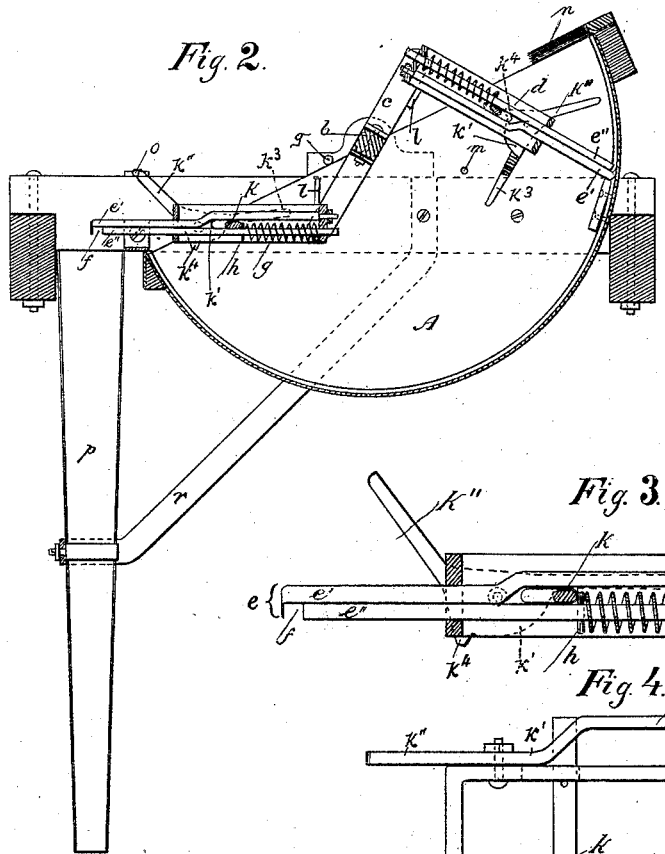
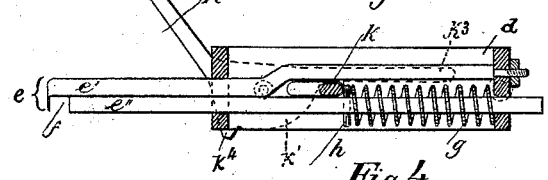
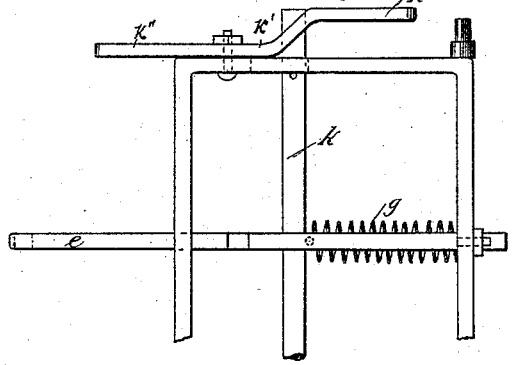
WITNESSES:
INVENTORS (No Model.)  3 Sheets—Sheet 3.

J. B. HURD & H. H. McLANE.
SINGLE SEED PLANTER.

No. 445,641.  Patented Feb. 3, 1891.

WITNESSES:

INVENTORS

UNITED STATES PATENT OFFICE.

JUDSON B. HURD AND HIRAM H. McLANE, OF SAN ANTONIO, TEXAS; SAID HURD ASSIGNOR TO SAID McLANE.

SINGLE-SEED PLANTER.

SPECIFICATION forming part of Letters Patent No. 445,641, dated February 3, 1891.

Application filed March 4, 1890. Serial No. 342,676. (No model.)

*To all whom it may concern:*

Be it known that we, JUDSON B. HURD and HIRAM H. McLANE, citizens of the United States, residing at San Antonio, in the county of Bexar and State of Texas, have invented a new and useful Single-Seed Planter, of which the following is a specification.

Our invention relates to improvements in planting-machines, in which grasping-jaws pass through the seed box or hopper to gather a seed from the mass of seed and carry it to the discharge-tube or place of deposit; and the objects of our invention and improvements are, first, to provide a means of forcing the seed into the jaws as they pass through the seed-box, so as not to have to depend upon the seed to fall or make its way into the jaws by its own weight, and, second, to provide a means for dropping the seed one in a place at close intervals, and to do this without the jaws being required to move too rapidly through the seed-box. We attain the first object by using brushes to force the seed within the jaws and the second by causing several pairs of jaws to pass through the seed-box at the same time, and by the use of other mechanism, which is illustrated in the accompanying drawings, in which—

Figure 1:
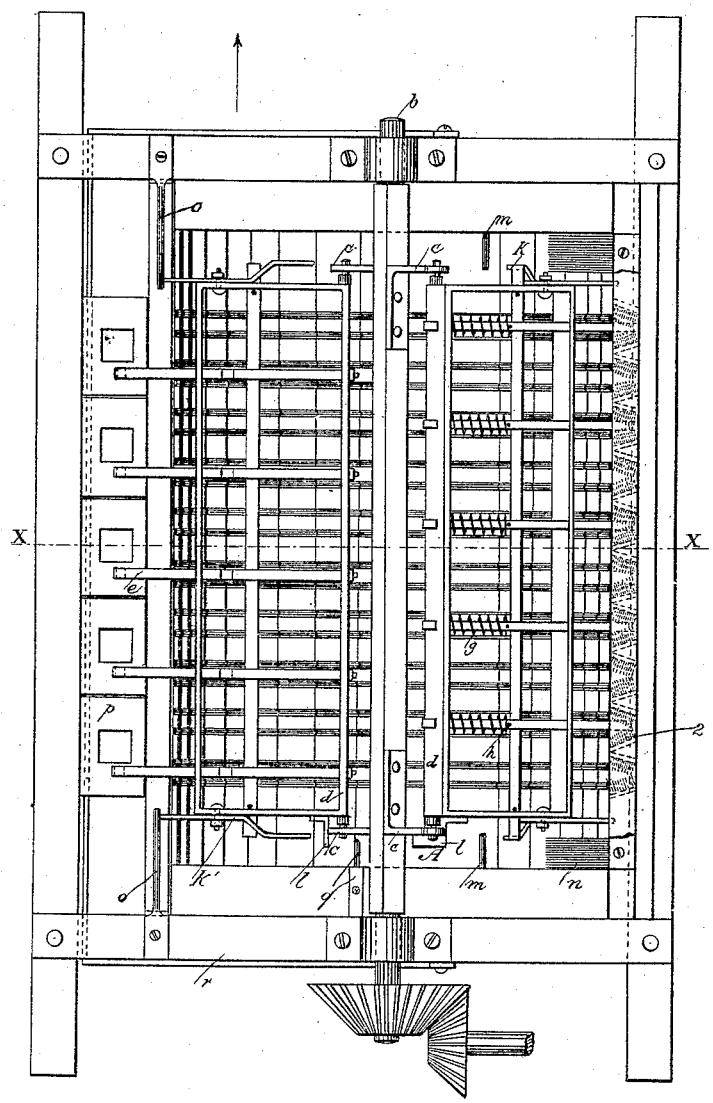
Figure 5:
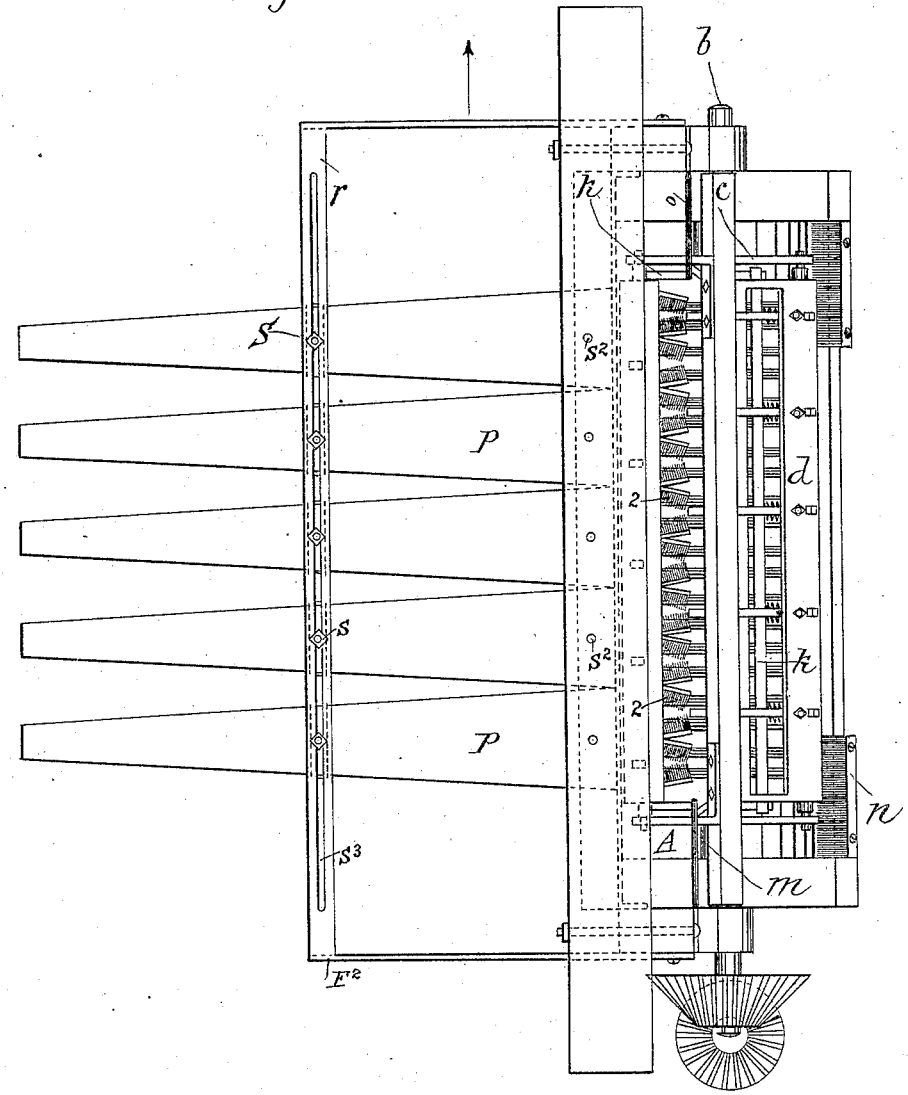

Figure 1 is a top view of the feeding mechanism. Fig. 2 is a sectional view on the line X X of Fig. 1. Figs. 3 and 4 are enlarged detail views. Fig. 5 is a side view, partly in section, showing the discharge-tubes and the frame that supports them.

Similar characters refer to similar parts throughout the several views.

A represents the seed-box, which may be of any suitable form, but preferably made, as shown, with vertical end walls and the bottom curved from front to rear. The bottom is also formed so as to have a series of ridges and furrows or grooves, that the seed will be inclined to gravitate within the path of the jaws as they pass through the grooves. The transverse shaft $b$, mounted in suitable bearings on the ends of the seed-box, is provided with two radial arms $c$ at each end, which arms revolve with the shaft and pass within the box. On opposite sides of the shaft $b$, and pivotally attached to the arms $c$ at each end, is a frame $d$. To this frame is secured a series of arms $e$.

It will be observed that there are twice as many grooves or furrows in the bottom of the box as there are arms $e$ on each frame, by which arrangement, when one set of arms passes through the box, the outer ends traveling along each alternate groove, the bulk of seed which has been previously placed in the box will be forced over and caused to fill the other grooves, and the other set of arms $e$ will force it back in turn, thus insuring that there will be seed always in the grooves when the arms pass.

The arms $e$ are made double, being composed of two square bars of iron $e'$ and $e''$. The outer end of the bar $e'$ is flattened and turned at right angles over the end of the bar $e''$, thus forming a pair of jaws $f$ at the outer end of the double arms $e$. Both bars, which constitute the double arms $e$, pass transversely through the frame $d$, the bar $e'$ being secured rigidly to the frame, the bar $e''$ being arranged to have a little longitudinal motion to open and close the jaws $f$. An off-set is made in the bar $e'$, leaving a little space between the two bars at one end, in order that the spiral spring $g$ may be placed upon the bar $e''$ and cause it normally to press outward and close the jaws $f$. One end of the spring presses against the inner side of the frame $d$ and the other end against the pin $h$. The cross-bar $k$ passes between the bars that constitute the double arm $e$, and rests against the pin $h$, opposite the spring. When this cross-bar $k$ is pressed against the pins $h$, the spring is compressed and the jaws are opened. On each side of the frame $d$ is arranged a cam $k'$, having an eccentric side or face, and provided with two extended ends or arms $k''$ and $k^3$, and a lug or stop $k'$. These cams are adapted to act upon the ends of the cross-bar $k$ to force it up to open the jaws $f$, as will be hereinafter more fully described.

The double arms $e$ are too long to pass through the seed-box if they extend out on a line with the arm $c$, so the frames being pivotally attached to the arms $c$ are allowed to double back until they are about at right angles with them, but are prevented from going farther by the angular pieces $l$, which are secured to the frames and strike against the arms $c$.

By the revolution of the shaft $b$ the jaws $f'$ are caused to travel along the grooves in the bottom of the seed-box from side to side, the cam $k'$ holding the jaws open to receive the seed. Inside of the seed-box the brushes 2 are placed on each side of each groove or furrow. These brushes are adapted to force the seed into the jaws, as the same shall pass between them. These brushes may be made of bristles, spring-wire, or other suitable material.

On the end walls of the box A on the inside is a tripper arm or pin $m$, arranged in such position that the upwardly-extending end or arm $k^3$ of the cam will pass under it, and thus be turned, allowing the jaws to be closed by the force of the spring before the jaws have passed entirely between the brushes. After leaving the bulk of the seed in the box, and while still within the box, the arms and jaws come in contact with the stripper-brushes $n$, which are arranged and adapted to prevent the arms from carrying out of the seed-box any seed other than that grasped between the jaws. After the jaws have passed over the top of the box and are moving downward to enter the box again the angular piece $l$ comes in contact with the pin $q$, which causes the double arms $e$ to fall faster, and thereby be straightened out nearly or quite on a line with the arms $c$, thus throwing the jaws outside of the seed-box and over the tubes $p$, which are adapted to conduct the seed to the ground. In falling and before the arms $e$ reach the tubes $p$ the outwardly-extended ends or arms $k''$ of the cams $k'$ come in contact with the pins $o$, which project from each end of the box and are adapted to turn the cam and force the jaws open and cause the seed to fall into the discharge-tubes $p$. Then as the shaft continues to revolve the frames $d$, carrying the arms $e$, are doubled back until they are contracted enough to pass inside the box and travel along the grooves, the lower jaw pressing gently against the bottom of it. In the drawings two frames are shown with five double arms or pairs of jaws on each frame; but the number of frames may be increased or reduced, or the length of the frames may be increased or reduced, to admit of a greater or less number of arms on each frame. The greater the number of frames or the arms on the frames the less speed will be required for the shaft, whereby the seed may be dropped as close together as desired without too much wear and tear upon the implement. It can be seen that the distance the seed is to be apart in the ground can be regulated by spreading the bottom of the discharge-tubes $p$ farther apart or fixing them nearer together. This result is obtained by the use of the slotted frame $r$ and fastenings $s$, the said discharge-tubes being mounted pivotally upon pins or supports $s^2$, which permit the discharge-tubes to swing to any desired positions, the fastening-bolts $s$ sliding in the slot $s^3$ of the frame $F^2$.

The shaft may be driven by any suitable system of gearing, whereby the jaws on one of the frames $d$ discharge their seed as often as the implement passes forward a distance equal to the space occupied by the lower part of the discharge-tubes, thus leaving the seed in a continuous and uniform row in the ground.

We are aware that planters have been made having grasping-jaws to gather the seed from the seed-box and carry it to the discharge-tube, and such planter may be used in planting corn or other seed that can be depended upon to always gravitate within reach of the jaws and find its way into them as they pass through the box, but in planting cotton something more is required.

There are so many enemies to cotton in its early growth, and, indeed, to seed while in the ground, that it is desirable to drop the seed close together—say from two to five inches apart; but if it is much nearer or planted so that it comes up in bunches it cannot be thinned and cultivated by horse implements alone, but must be thinned with the hand or hand-hoe at very great expense, so the object of this invention is to provide a planter that the jaws will be certain to gather a seed every time they pass through the box and will drop as near together as may be desired.

Cotton-seed being very light and covered with fiber, a single seed will not leave a mass of seed and find its way into the jaws every time they pass through the box, so we have provided the brushes 2 to force the seed into the jaws. Again, if the grasping-jaws follow each other through the box and only one drops its seed at a time, in order to drop the seed as close as required they must follow each other in such rapid succession as to make it uncertain about their securing a seed and dropping it every time. We have therefore provided for several pairs of jaws to pass through the seed-box at the same time, whereby the seed may be dropped as close as desired without requiring the arms and jaws to move too rapidly through the seed-box.

We are aware that stripping or cut-off brushes have been used in planters; but it will be observed that such brushes were used for the purpose of stripping off the surplus seed, and are not arranged and adapted to force the seed into the jaws.

It will be observed that the grasping-jaws in our machine are arranged to pass through the seed-box in a direction at right angles with the course of the implement through the field and that several jaws discharge their seed at the same time. This arrangement is found to be quite necessary when it is desired to drop the seed at regular intervals. With the machines that drop one seed in a place and one at a time the horse must travel at a uniform rate of speed to leave the seed at a uniform distance apart; but in this machine the distance the seed is left apart in the ground is regulated by the distance of the lower ends of the discharge-tubes apart.

Having fully described our invention, what we claim, and desire to secure by Letters Patent, is—

1. In a planter, a seed-box having its length extending in line with the row to be planted, through which a number or series of grasping-jaws may pass in a direction transversely of the course of the implement across the field, as and for the purposes specified.

2. In a planter, a number or series of grasping-jaws arranged in line with each other and adapted to pass through a seed-box transversely of the course of the implement, as and for the purposes specified.

3. In a planter, a seed-box having its length extending in line with the row to be planted and furnished with a number or series of grooves running transversely of the course of the implement, formed to receive grasping-jaws arranged to move transversely through the box, as and for the purposes specified.

4. In a planter, the combination, with the seed-box having a curved or semi-cylindrical bottom, and the grasping-jaws arranged to move transversely through the seed-box, of the brushes arranged in the latter and engaging the sides of the jaws to force the contents of the seed-box into the latter, as set forth.

5. In a planter, two or more groups or sets of grasping-jaws arranged to follow each other across or through the seed-box transversely of the course of the implement and engaging with and following through the grooves formed in the bottom of the seed-box and adapted to receive them, said groups or sets being arranged to occupy adjoining and alternate grooves in their passage through the box, as and for the purposes specified.

6. In a planter having a number or series of grasping-jaws placed in line with each other and adapted to pass in such line through the seed-box, the rod $k$, springs $g$, lever-cams $k'\,k'$, and pins $h, m$, and $o$, adapted and arranged to open and close said jaws, as shown and described, and for the purposes specified.

7. In a planter, the combination of the double series of arms $e$, adapted to pass through the seed-box A transversely of the course of the implement, with the brush or series of brushes $n$, adapted to keep the surplus seed within the box, as shown and described, and for the purposes specified.

8. In a planter having a number or series of grasping-jaws arranged to pass through the seed-box transversely of the course of the implement, the combination of the frame $d$, the angle-iron $l$, and pin $q$, adapted to throw the jaws over the discharge-tubes $p$, as shown and described, and for the purposes specified.

9. In a planter having a number or series of grasping-jaws arranged to pass through the seed-box transversely of the course of the implement, a set of discharge-tubes arranged in line with the course of the implement, adapted to receive the seed from the jaws and discharge the same simultaneously into the furrow, as shown and described, and for the purposes specified.

10. In a planter having a number or series of grasping-jaws arranged to pass through the seed-box transversely of the course of the implement, the combination of the set of discharge-tubes $p$ with the slotted frame $r$ and fastenings $s$, whereby the tubes may be adjusted to the required distance of the seeds apart, as shown and described, and for the purposes specified.

11. In a planter having a number or series of grasping-jaws arranged to pass through the seed-box transversely of the course of the implement, the combination of the box A, the shaft $b$, and series of arms $e$, comprising the rigid members $e'$ and the sliding spring actuated members $e''$, as and for the purposes specified.

12. In a planter having a number or series of grasping-jaws arranged to pass through the seed-box transversely of the course of the implement, the combination of the seed-box A, shaft $b$, pins $h\ o\ m\ n$, angle-iron $l$, brushes $n$ and 2, tubes $p$, frame $r$, fastenings $s$, cam $k'$, rod $k$, oblong frame $d$, arms $c$, arms $e$, comprising the members $e'\ e''$, jaws $f$, and springs $g$, as and for the purposes specified.

JUDSON B. HURD.
HIRAM H. McLANE.

Witnesses:
J. N. GROESBEECK,
H. S. GROESBEECK.